United States Patent [19]

Helm

[11] 3,954,762

[45] May 4, 1976

[54] MIXED AMINE-PHENOL HARDENERS FOR EPOXY RESINS

[75] Inventor: Dietrich Helm, Unna, Germany

[73] Assignee: Schering AG., Berlin and Bergkamen, Germany

[22] Filed: July 11, 1974

[21] Appl. No.: 487,742

Related U.S. Application Data

[62] Division of Ser. No. 318,109, Dec. 26, 1972, Pat. No. 3,853,812.

[30] Foreign Application Priority Data

Jan. 7, 1972 Germany............................. 2200717

[52] U.S. Cl............................. 260/268 PL; 252/182; 260/2 N; 260/2 EC; 260/59 EP; 260/47 EC; 260/47 EN; 260/563 P; 260/563 C; 260/567.5; 260/570.9; 260/583 P; 260/584 B; 528/492

[51] Int. Cl.$^2$........................................ C07D 295/12

[58] Field of Search....... 260/268 PL, 268 R, 583 P, 260/563 P, 563 C, 570.9, 567.5, 584 B

[56] References Cited

UNITED STATES PATENTS 3,853,812   12/1974   helm .............................. 260/268 PL

*Primary Examiner*—Alton D. Rollins
*Assistant Examiner*—Jose Tovar
*Attorney, Agent, or Firm*—Curtis, Morris & Safford

[57] ABSTRACT

Association products, useful as a hardener for epoxy resins, formed between
 a. a liquid polyamine having 3 – 5 amino hydrogen atoms;
 b. a liquid primary monoamine; and
 c. a liquid alkylmonophenol.

Adducts formed between this association product and an epoxy resin.

Methods of hardening an epoxy resin, with or without intermediate formation of an adduct, using the aforementioned association products.

1 Claim, No Drawings

MIXED AMINE-PHENOL HARDENERS FOR EPOXY RESINS

This is a division, of application Ser. No. 318,109, filed Dec. 26, 1972 now U.S. Pat. No. 3,853,812, issued 12/10/74.

The present invention relates to hardeners for epoxy resins, to adducts formed between said hardeners and an epoxy resin, and to methods of hardening epoxy resins. More in particular, the invention relates to hardeners, adducts, and methods of hardening which form soft to tough/hard molding materials which do not tend to crack or craze, despite the high reactivity of the systems at room temperature.

Several means have already been proposed for obtaining flexible casting resin masses comprising epoxy systems which can be hardened without heating. On the one hand, it was sought to solve the problem by modifying the epoxy resin, particularly by employing long chain diepoxides such as the diepoxides of polyether polyols as the epoxy resin component. On the other hand, it was also proposed to attack the problem by way of the hardener, for example by using diamines having ether bridges in the carbon chain as hardeners.

These and other proposals have the disadvantage that hardened soft casting resin masses, particularly, show a high water uptake, which renders them unsuitable for use in certain applications, for example in the electrical field.

It has also been sought to make epoxy resin systems more flexible by the use of external plasticizers such as dibutylphthalate. However, these materials can only be added in limited amounts since they tend to sweat from the resins even at room temperature.

The problem has also not been satisfactorily solved by the use, for the hardening of epoxy resins, of certain saltlike complexes of polyvalent amines with alkylphenols or with alkylphenol-containing tar fractions.

Hardening agents for epoxy resins according to the present invention are association products of a. liquid polyamines of aliphatic, cycloaliphatic, and araliphatic hydrocarbons or ether-hydrocarbons, or of N-aminoalkyl piperazines, having 3 - 5 amino hydrogen atoms;

b. liquid primary monoamines of aliphatic, cycloaliphatic, and araliphatic hydrocarbons;

c. liquid alkylmonophenols, comprising from 0.3 to 3 equivalents of monoamine amino hydrogen per equivalent of polyamine amino hydrogen, and 0.25 to 1 equivalent of alkylmonophenol per equivalent of total amino nitrogen. Components (a), (b), and (c) are all liquid at room temperature (e.g. 20° – 25°C.)

The aforementioned hardeners harden epoxy resins by the formation of polyadducts between the epoxy and amine compounds in the hardeners.

Using the hardeners according to the invention, soft to tough/hard hardened epoxy resins having relatively low water uptake are obtained, depending upon the chosen ratio of monoamine to polyamine and on the content of alkylmonophenol.

Further, epoxy resin systems formulated with the hardeners according to the present invention, despite a high reactivity, show little tendency to crack or craze, even when relatively large casting volumes are involved.

The epoxy resins which can be hardened with the hardeners according to the invention are, generally, liquid polyglycidyl ethers and polyglycidyl esters, particularly liquid diglycidyl ethers of bis-phenols, for example of diphenylolpropane or diphenylolmethane, or of diphenylols such as resorcinol, and of novolaks (phenol-aldehyde-condensation products); as well as diglycidyl esters such as trimethyladipic acid diglycidyl ester and hexahydrophthalic acid diglycidyl ester; diglycidyl ethers of polyalcohols, such as of polyalkylene glycols, polymeric fatty alchols, and the like; as well as mixtures of these materials with each other or with reactive diluents such as butyl-, allyl-, phenyl-, or cresyl-glycidyl ethers, diglycidyl ethers, butanediol diglycidyl ether, and the like.

The liquid polyamines suitable for the hardeners of the present invention have from 3 – 5 amino hydrogen atoms per molecule. Since the association products employed as hardening agents according to the invention may contain certain amounts of free amine, depending on the chosen ratio of alkylphenol to total amine, those amines whose vapor pressure is not too high are preferred, in order to decrease the danger of skin irritation. Such amines generally have at least 4 carbon atoms. For these reasons, and because of their ready accessibility, amines such as 2,2,4-and 2,4,4-trimethyl hexamethylene diamine; nonadecane diamine; xylylene diamine; 3,3'-dimethyl-4,4'-diaminodicyclohexylmethane; 3-(aminomethyl)-3,5,5-trimethyl-1-cyclohexylamine; N-cyclohexylpropylene diamine; N-aminoethyl-piperazine; diethylene triamine; dipropylene triamine; and the like are preferred. The polyamines are hydrocarbons or may also contain ether groups, such as diamino-4,7-dioxadecane or diamino-4,9-dioxadodecane.

For the same reasons mentioned above, those primary monoamines having a low vapor pressure are preferred. Again, such amines generally have at least 4 carbon atoms. These include, for example, hexylamine and cyclohexylamine; trimethylcyclohexylamine; 2-ethylhexylamine; dodecylamine; octadecylamine; mixtures of amines which are derived from natural fatty acid mixtures, such as coconut oil amines; and araliphatic amines such as benzylamine.

Liquid alkylmonophenols which can be used in the hardeners of the present invention preferably have alkyl groups with from 6 to 20 carbon atoms, such as hexylphenol, octylphenol, nonylphenol, dinonylphenol, dodecylphenol, and the like.

At higher ratios of monoamine to di- or poly-amine in the hardeners according to the present invention, the epoxy resins hardened therewith are increasingly more flexible. When the alkylmonophenol is also present in amounts at the upper end of the aforementioned range, the hardened products are still softer.

By the use of reactive diluents in the epoxy resin component, the extension on break can be further increased.

For hardening epoxy resins according to the present invention, the epoxy resin component is, in the simplest case, combined with the hardening agent of the invention, homogeneously admixed, and then the mixture is left to harden. In thick layers this occurs with the release of heat. Hardening can also be accelerated by the application of heat, as is known. Generally, the components are combined such that from 0.8 to 1.5 equivalents, preferably from 1.0 to 1.2 equivalents, of amino hydrogen are present per epoxy equivalent.

Fillers, coloring agents, and auxiliary materials can be added to the epoxy resin and/or to the hardening agent of the invention before these are mixed, or they can be added to the mixture during the mixing process. The last-mentioned procedure is particularly recommended if large amounts of coarsely grained fillers are employed.

When the process of the invention is employed in a continuous fashion, dosing of the components and, optionally, also mixing of the epoxy resin and hardener, can take place using known multi-component dosing and mixing apparatus.

In order to avoid greasy or tacky surfaces which might form under unsatisfactory hardening conditions, such as low ambient temperatures or at high humidity, particularly when small layer thicknesses are involved, the hardening agents of the present invention can be reacted in a manner known in the art to form so-called adducts.

To form these adducts, a portion of the epoxy resin, which may be up to 30 percent -- preferably from 10 – 25 percent -- of the total equivalents of amino hydrogen involved, is combined with the hardening agent. The addition reaction takes place by itself over the course of several hours. It can be accelerated by the application of heat. Also, in the preparation of adducts, a mixture of the amine components of the hardener can first be mixed and reacted with the aforementioned amount of epoxy resin, with the alkylmonophenol being subsequently added. However, the first-mentioned method of forming an adduct is more practical.

As epoxy resins to be used for the preparation of the adducts with the hardening agents of the present invention, all the previously-mentioned polyglycidyl ethers and polyglycidyl esters can be employed. In general, for reasons of cost, liquid diglycidyl ethers of bisphenols, particularly of bisphenol A, or mixtures of the same with reactive diluents, are preferred.

Epoxy resin systems comprising the hardeners of the present invention can be used particularly for the flexible embedding of cable connections and cable-end terminals, for the strain-free embedding of electronic components, as flexible resins in construction, or also for coating sealing, filling and joining agents, optionally with the addition of fillers and auxiliaries.

In the following examples, given by way of illustration, epoxy resin A is a diphenylolpropane diglycidyl ether having an epoxy equivalent weight of 190. Eposy resin B is a diphenylolpropane diglycidyl ether diluted with 22 percent by weight of cresyl glycidyl ether.

EXAMPLE 1 a. 50 parts by weight of coconut oil amine (commercially available under the tradename "Dehymin DK"), 50 parts by weight of trimethylhexamethylene diamine (equivalence ratio = 0.41:1), and 147 parts by weight of p-nonylphenol (75 equivalent percent calculated on N) are mixed at room temperature with a slight exothermic reaction. 73 parts by weight of this association product of the present invention are mixed with 100 parts by weight of epoxy resin A and the mixture is left to harden in molds overnight. The 4 mm thick plates obtained are tempered on the next day by heating for 2 hours at 120°C. The casting resin material obtained has a tensile strength of 404 kilograms of force per square centimeter (kgf/cm$^2$) with a 12 percent extension at break (DIN 16946, page 1). The water uptake of the material is 6.6 mg (24 hours at 24°C.) and 38 mg in boiling water after 30 minutes. The same test results are obtained if the hardening is carried out for seven days at room temperature.

If this hardener and epoxy resin A are mixed at 20°C. and at a relative humidity of over 90 percent, and then thin layers (for example, less than 1 mm) of the mixture are left to harden under these conditions, the coating obtained has a slightly tacky surface. To avoid this, 73 parts by weight of the association product (hardener) can first be mixed with 10 parts by weight of epoxy resin A and adduct formation permitted to take place overnight. If, on the next day, the remaining 90 parts by weight of epoxy resin A are then combined, and permitted to harden in thin layers at 20°C. and in a relative humidity of over 90 percent, tack-free shiny surfaces are obtained.

b. 73 parts by weight of the association product formed according to the invention in Example 1(a) are mixed with 100 parts by weight of epoxy resin B. The mixture is hardened and tested as in Example 1(a).

The cast resin body obtained has a tensile strength of 43 kgf/cm$^2$ with 92 percent extension at break. The water uptake is 10.7 mg and 47 mg under the conditions described above, respectively.

EXAMPLE 2

50 parts by weight of coconut oil amine, 50 parts by weight of trimethylhexamethylene diamine (equivalence ratio = 0.41:1), and 70 parts by weight of p-nonylphenol (36 equivalent percent calculated on N) are mixed with slight exothermicity. 50 parts by weight of the association product so obtained are mixed with 100 parts by weight of epoxy resin B and hardened and tested as in Example 1(a).

The cast resin body so obtained has a tensile strength of 310 kgf/cm$^2$ with an extension at break of 37 percent. The water uptake under the test conditions earlier described is 8.5 mg and 43 mg, respectively.

EXAMPLE 3

75 parts by weight of benzylamine, 36 parts by weight of 3,3'-dimethyl-4,4'-diamino-dicyclohexylmethane (equivalence ratio = 2.33:1), and 147 parts by weight of p-nonylphenol (67 equivalent percent calculated on N) are mixed with release of heat. 68 parts by weight of the association product so obtained according to the invention are mixed with 100 parts of epoxy resin A and hardened and tested as in Example 1(a).

The cast resin body so obtained shows a tensile strength of 690 kgf/cm$^2$ at an extension at break of 2.4 percent. The water uptake amounts to 6.0 mg and 36 mg.

EXAMPLE 4

19.4 parts by weight of 2-ethylhexylamine, 27.6 parts by weight of trimethylhexamethylene diamine (equivalence ratio = 0.43:1), and 55 parts by weight of p-nonylphenol (50 equivalent percent calculated on N) are mixed with release of heat. 55 parts by weight of the association product according to the invention formed in this way are mixed with 100 parts by weight of epoxy resin B and hardened and tested as in Example 1(a).

The cast resin body so obtained shows a tensile strength of 230 kgf/cm$^2$ at an extension at break of 34 percent. The water uptake is 7.7 mg or 46 mg.

EXAMPLE 5

38 parts by weight of coconut oil amine, 15.7 parts by weight of dipropylene triamine (amino hydrogen ratio = 0.67:1) and 55 parts by weight of p-nonylphenol (45 equivalent percent calculated on N) are mixed with release of heat. 57 parts by weight of the association product so obtained are mixed with 100 parts by weight of epoxy resin A and hardened and tested as in Example 1(a).

The cast resin body so obtained has a tensile strength of 560 kgf/cm$^2$ and an extension at break of 6.5 percent. The water uptake is 8.4 mg and 41 mg.

EXAMPLE 6

71.5 parts by weight of coconut oil amine, 21.5 parts by weight of N-aminoethyl piperazine (amino hydrogen ratio = 1.5:1), and 125 parts by weight of p-nonylphenol (65 equivalent percent calculated on N) are mixed with a small release of heat. 90 parts by weight of the association product formed in this way according to the invention are mixed with 100 parts by weight of epoxy resin A and hardened and tested as in Example 1(a).

The cast resin body so obtained has a tensile strength of 80 kgf/cm$^2$ and an extension at break of 135 percent. The water uptake is 18 mg and 50 mg.

Practically the same results are obtained if the mixture of the association product according to the invention and the epoxy resin are left to harden for several days at about 23°C. before testing.

EXAMPLE 7

50 parts by weight of coconut oil amine, 50 parts by weight of trimethylhexamethylene diamine (equivalence ratio = 0.41:1), and 169 parts by weight of dodecylphenol (36 equivalent percent calculated on N) are mixed with a slight generation of heat. 79.2 parts by weight of the association product so obtained are mixed with 100 parts by weight of epoxy resin B as described in Example 1(a), hardened, and tested.

The cast resin material obtained showed a tensile strength of 73 kgf/cm$^2$ with an extension at break of 132 percent. The water uptake was, respectively, 10.8 mg and 41 mg.

What is claimed is:

1. An association product consisting essentially of, in admixture,
   a. a polyamine having 3 – 5 amino hydrogen atoms, selected from the group consisting of N-aminoalkyl piperazines and amines of aliphatic, cycloaliphatic, and araliphatic hydrocarbons and ether-hydrocarbons;
   b. a primary monoamine of an aliphatic, cycloaliphatic, or araliphatic hydrocarbon; and
   c. an alkylmonophenol; said mixture having from 0.3 to 3 equivalents of monoamine amino hydrogen per equivalent of polyamine amino hydrogen and 0.25 to 1 equivalent of alkylmonophenol per equivalent of total amino nitrogen and (a), (b), and (c) being liquid at room temperature.

* * * * *